United States Patent [19]

Chien

[11] Patent Number: 5,075,541

[45] Date of Patent: Dec. 24, 1991

[54] OPTICAL IMAGE DETECTING DEVICE WITH OPTICAL IMAGE DIFFERENTIAL CAPABILITY

[76] Inventor: Fong K. Chien, 5F, No. 3, Lane 359, Sec. 2, Chung Shan Road, Chung Ho City, Taipei Hsien, Taiwan

[21] Appl. No.: 578,369

[22] Filed: Sep. 6, 1990

[51] Int. Cl.$^5$ ................................................ H01J 3/14
[52] U.S. Cl. .................................. 250/216; 250/221; 340/710; 359/664; 359/642
[58] Field of Search ............ 250/216, 221, 229, 287 R, 250/231.14, 237 G; 350/252, 416, 440, 407; 340/710; 235/472, 462

[56] References Cited

U.S. PATENT DOCUMENTS

| | | | |
|---|---|---|---|
| 2,402,216 | 6/1946 | Vennigerholz | 350/416 |
| 4,796,756 | 1/1989 | Ott | 350/252 |
| 4,906,843 | 3/1990 | Jones et al. | 250/221 |

Primary Examiner—David C. Nelms
Assistant Examiner—Que T. Le
Attorney, Agent, or Firm—Lowe, Price, LeBlanc & Becker

[57] ABSTRACT

An optical image detecting device with optical image differential capability, comprising a plurality of lens assemblies in quantity corresponding to the sort and amount of optical images to be discriminated, which lens assemblies are each comprised of a certain amount of optical lenses. The lens assemblies are disposed at respective angle positions corresponding to the relative angle positions of the optical images to detect. The shaded portion of each optical image which projects on each lens is larger than the thickness of each lens but smaller than the maximum diameter of each lens.

1 Claim, 5 Drawing Sheets

OPTICAL IMAGE DETECTING DEVICE WITH OPTICAL IMAGE DIFFERENTIAL CAPABILITY

BACKGROUND OF THE INVENTION

The present invention relates to a structure of optical image detecting device with optical image differential capability which is comprised of a plurality of lens assemblies in quantity and angle positions corresponding to the optical images to detect, each optical lens of which has a thickness smaller than the shaded projection of each optical image but a maximum diameter larger than the shaded projection of each optical image.

Optical image detecting technique is very important in the field of precision technology. In the arrangement of single light source, single variation and single receiver, a receiver is simple in structure and designed to detect the availability of light ray (on/off of a light source; or pass or blocking of light beam). When multiple light sources, multiple variations and multiple receivers are required, the relative arrangement of the light sources, the mode of variations and the receivers becomes more complicated. For two or more optical image changes multiple light sources are used, i.e. an additional light source and a specific receiver are provided for each change. In order to prevent from interference of optical image against each other, light sources of different wavelength are commonly used. Therefore, a receiver is designed to receive signal from an optical image of specific wavelength. The common disadvantage of this optical image differential method is its complicated structure and expensive manufacturing cost. Because it is inexpensive to manufacture a light source of specific wavelength. In order to control receivers to respectively act on a specific light beam of a specific wavelength, the design of the posterior electronic circuit becomes more complicated. Further, the more the light sources are used, the bigger the space is occupied. Optical image detecting technique has been widely used in various fields. Electro-optical mouse is an example. In the conventional optical mouse, two separate light sources are generally used for differentiating the motion in the X direction from the Y direction on the pad, i.e. one to reflect on the grid of lines in the X direction and the other to reflect on the grid of lines in the Y direction. The wavelength of the first light source is different from the second source. Corresponding to the two separate light sources, two receivers (detectors) are provided inside the optical mouse to respectively detect the image from the illuminated surface. Upon detection of reflected image, the receivers (detectors) provide "Hi" or "Lo" output, according to the shading of detected image, to a posterior electronic circuit for counting line crossings (shading change) so that observed detector motion on the surface in X, Y can be made to correspond to cursor motion for a video display. This arrangement cannot eliminate the aforesaid problems of complicated structure and expensive manufacturing cost.

SUMMARY OF THE INVENTION

The present invention has been accomplished to eliminate the aforesaid problems, which can differentiate and detect the images in X and Y directions reflected from the pad of an optical mouse under single light source arrangement. According to the present invention, an optical image detecting device is comprised of a plurality of lens assemblies disposed in quantity and angle positions corresponding to the optical images to be differentiated. Each lens assembly will only be imaged by the corresponding optical image reflected by a common, simple light source to produce a corresponding signal, according to the change of detected optical image (shading or availability of light), for counting the amount of motion.

BRIEF DESCRIPTION OF THE DRAWINGS

The present invention will now be described by way of examples with reference to the annexed drawings, in which.

DETAILED DESCRIPTION OF THE PREFERRED EMBODIMENT

Figure 1:
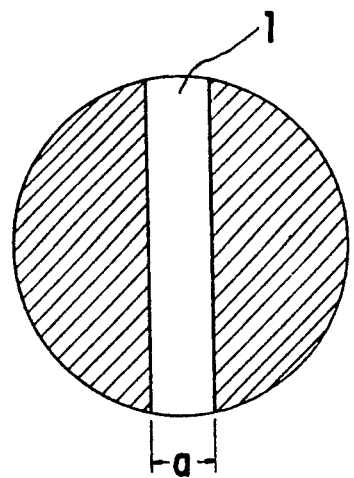
FIG. 1 illustrates the formation of an optical lens of the present invention from a transparent sphere.

Referring to FIG. 1, an optical lens 1 is formed by cutting a transparent sphere bilaterally from the middle. As illustrated, the two opposite, equivalent parts (the portions of oblique lines) are cut off from the transparent sphere with the middle part 1 left for use as an optical lens 1. The range "a" is defined as the thickness of the optical lens 1.

Figure 2:
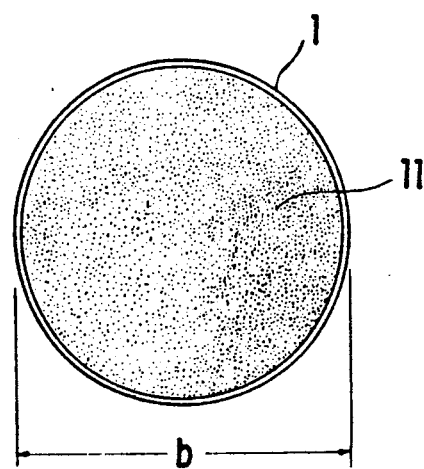
FIG. 2 is a side view of an optical lens of the present invention.

FIG. 2 is a side view of an optical lens 1 of the present invention, the two opposite sides 11 of which are each a coarse or opaque surface or coated with black coating material which can protects against interference of light. As illustrated in the drawing, the range "b" is called the maximum diameter of the lens.

Figure 3:
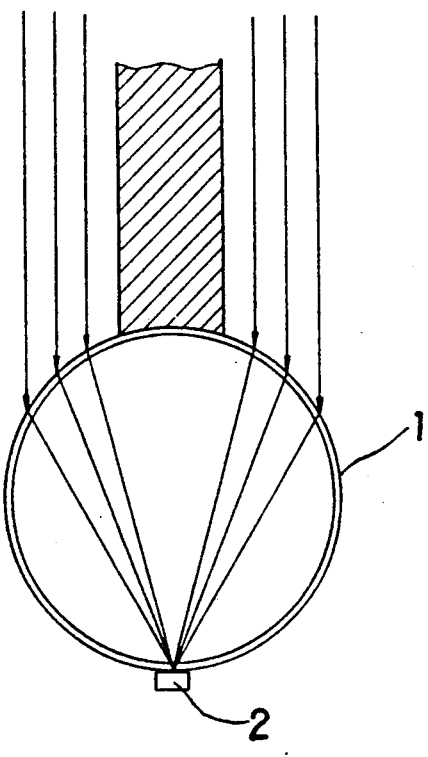
FIG. 3 illustrates the convergence of light beam onto a photo-sensor through an optical lens of the present invention.

FIG. 3 illustrates an application of an optical lens 1 of the present invention. Because a transparent sphere can converge light rays into a focus (same as the effect of a convex lens), an optical lens 1 of the present invention can also converge light rays into a focus. Therefore, any light beam which projects onto the upper periphery of the optical lens 1 can be converged into a focus at the bottom. If to place a photo-sensor 2 at the focus area at the bottom of the optical lens 1, a photo-sensor 2 will be sensed if there is any light beam projected onto the upper periphery of the optical lens 1. Even if a light beam contains a shaded portion (the portion of oblique lines) which is smaller than the maximum diameter "b" of the optical lens 1, it still will be converged into a focus at the bottom of the optical lens 1 to sense the photo-sensor 2. The photo-sensor 2 will not be sensed only when the shaded portion of the projected light beam covers over the whole area defined within the range "a" and the range "b" of the optical lens 1.

Figure 4:
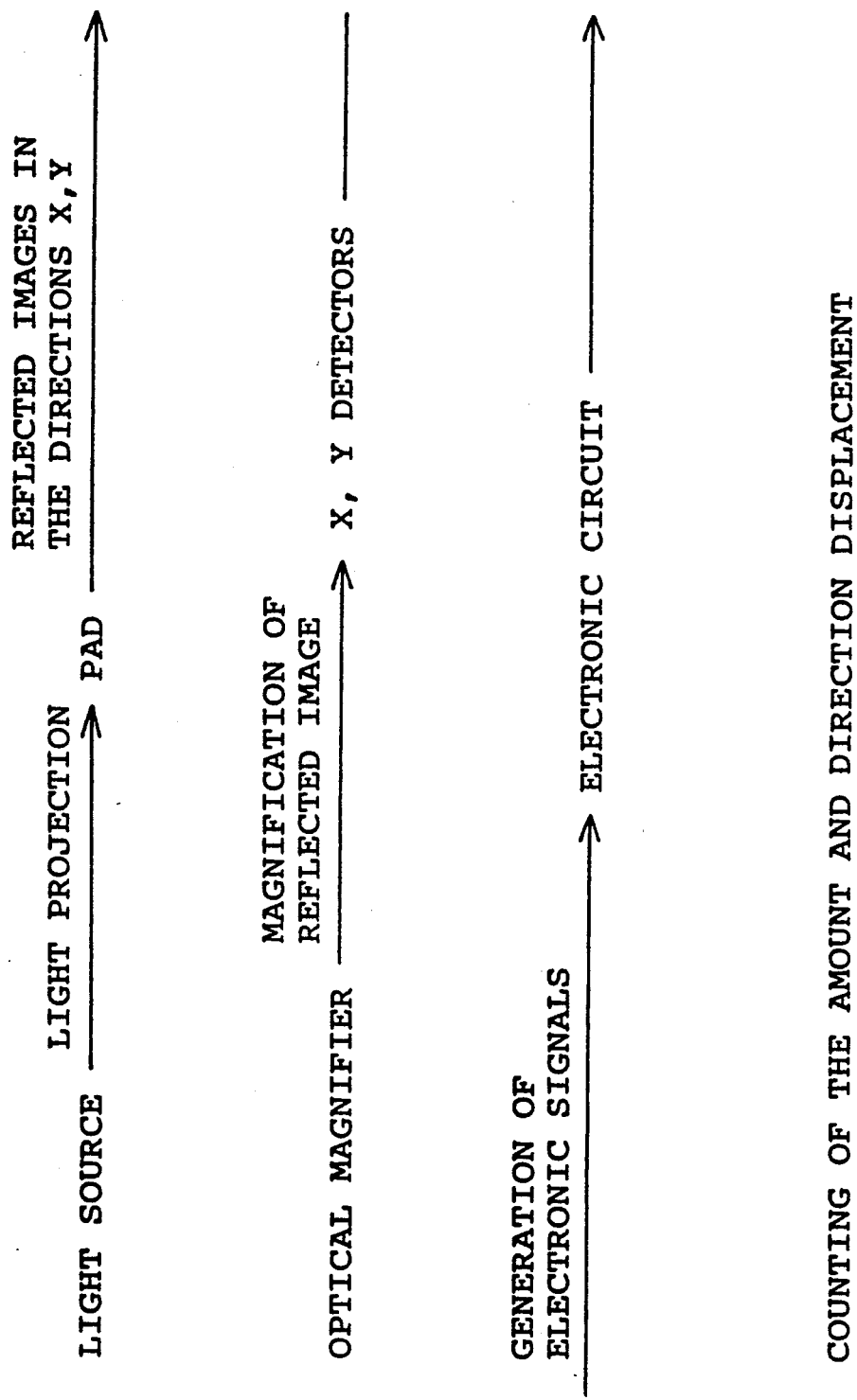
FIG. 4 is a signal flow chart of a conventional optical mouse.

FIG. 4 illustrates a signal flow chart in an optical mouse, which is of the known art, not within the scope of the present invention, and provided for reference only.

Figure 5:
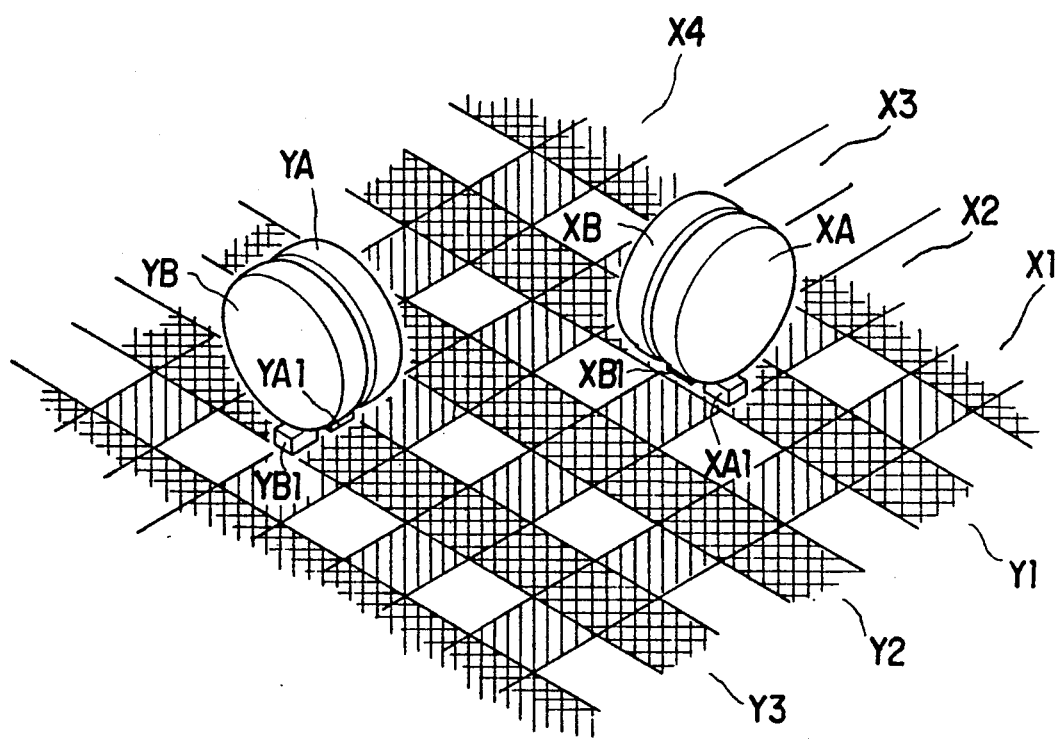
FIG. 5 illustrates the application of the present invention in an optical mouse.

FIG. 5 illustrates the application of the present invention in an optical mouse. Because a PAD has a plurality of longitudinal and transverse lines thereon, a plurality of shaded portions corresponding to the longitudinal and transverse lines will be formed in reflected optical images when a light source is projected onto a PAD. After the reflected optical image is magnified, it is projected onto the present invention. For collecting optical images from X-axis and Y-axis, two sets of lens assemblies XA-XB, YA-YB must be provided. Since optical image from X-axis is in vertical to that from Y-axis, the two sets of lens assemblies XA-XB, YA-YB must be disposed vertical in vertical direction against each other. As illustrated in FIG. 5, the shaded portions Y2, X2 respectively shield the lenses YB, XB to protect the photo-sensors YB1, XB1 against light so that the photo-sensors YB1, XB1 produce an electronic signal of "Hi". Because the lenses XA, YA are not shielded, the photo-sensors YA1, XA1 are sensed by light to produce an electronic signal of "Lo". Assume that the optical mouse is moved on the PAD along Y-axis, thus, the shaded portions X1, X2, X3 and X4 etc., will pass through the lenses XB, XA to drive the photo-sensors XB1, XA1 to alternatively produce electronic signals of "Hi" and "Lo". Since the lens YB is constantly shielded by the shaded portion Y2, the output of "Hi" from the photo-sensor YB1 remains unchanged. Although the shaded portion X4 passed through the lens YA, because its width is constantly smaller than the maximum diameter of the lens YA (refer to the illustration of FIGS. 2 and 3), the lens YA will not be completely shielded, and therefore, the photo-sensor YA1 will be constantly sensed to maintain its output of "Lo". Because the output from the photo-sensors XA1, XB1 are changed while the output from the photo-sensors YA1, YB1 remain unchanged, the posterior electronic circuit can accurately figure out the amount of the displacement along Y-axis according to the frequency of signal change from photo-sensors XA1, XB1.

From the foregoing statement, it is apparent that the application of the present invention must be made under the circumstances outlined hereinafter.

1. The number of lens assemblies must be equal to the number of optical images to be identified;

2. The relative angle positions of the lens assemblies must be disposed according to the relative angle positions of the optical images to detect;

3. The width of the shaded portion in an optical image must be smaller than the maximum diameter of each lens and larger than the thickness of each lens; and 4. The number of lenses which compose a lens assembly is determined according to requirement.

Figure 6:
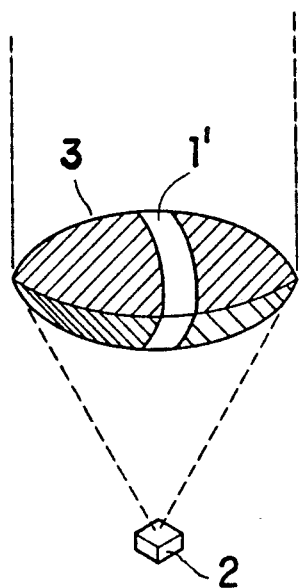
FIG. 6 illustrates an alternate form of optical lens according to the present invention.

Referring to FIG. 6, therein illustrated is an alternate form of optical lens 1' according to the present invention, which is made from a converging lens 3 (convex lens) by equivalently cutting off the two opposite parts (the portions of the oblique lines). In case this type of optical lens 1' is used, the matching photo-sensor 2 must be disposed at the focus of the converging lens 3.

I claim:

1. The optical image detecting device, comprised of a plurality of lens assemblies in quantity corresponding to the amount of optical images to be discriminated, said lens assemblies being comprised of a plurality of lenses and respectively disposed at positions corresponding to a relative angle positions of the optical images to detect, said lenses being each made, by equivalently cutting off two opposite parts of a transparent sphere or converging lens (convex lens) with two opposite sides treated to protect against penetration therethrough of light, in thickness smaller than and in diameter larger than the width of a shaded portion of the optical image to detect.

* * * * *